Patented July 19, 1927.

1,636,445

UNITED STATES PATENT OFFICE.

JAMES CRAIG SMALL, OF PHILADELPHIA, PENNSYLVANIA.

BACTERIUM SPECIFIC FOR RHEUMATIC FEVER AND METHOD OF UTILIZING THE SAME IN THE PREVENTION AND TREATMENT OF RHEUMATIC FEVER.

No Drawing.   Application filed January 12, 1927.   Serial No. 160,781.

My invention consists generally in the discovery of the specific Streptococcus of rheumatic fever and the employment thereof in the production of antigens, filtrates, toxins, vaccines and an antiserum for use in the prevention and treatment of rheumatic fever and other physical ailments which are clinical manifestations thereof.

Acute rheumatic fever has long been established as a clinical entity. Tonsillitis, arthritis, endocarditis, myocarditis, pericarditis and chorea are outstanding clinical manifestations attending this rather complex syndrome.

More recently the part played by acute rheumatic fever in established chronic heart conditions has come to be more and more appreciated. There has been much evidence offered to establish the tendency to chronicity as one of the most important characteristics of the cardiac manifestations of rheumatic fever. Many claim that the cardiac infection is established as a chronic condition in very many instances following the primary acute attack of the disease. The part played by the specific cause of rheumatic fever in the etiology of chronic arthritides has not been emphasized chiefly because these conditions do not lend themselves readily to a clinical classification.

The belief that rheumatic fever is an infectious disease has much in its support. Aside from what might be termed the characteristic nature of the clinical manifestations of the acute condition are the observations on its seasonal prevalence as well as those on its cyclic appearances in what appear to be low grade epidemics. The familiar appearance of multiple cases is also a pertinent observation in this connection.

The association of the onset of the disease with attacks of acute tonsillitis, together with the many bacteriological studies associating various Streptococci with the etiology of tonsillitis, has led to the belief in many quarters that a particular group of Streptococci is concerned as the etiological factor in rheumatic fever. From the appearance of a Streptococcus so constantly in the valvular vegetations of ulcerative endocarditis which has as its chief antecedent acute rheumatic fever, this association of Streptococci with the cause of rheumatic fever has been further emphasized. Much good work has been done in connection with the pathology of rheumatic endocarditis and of ulcerative endocarditis, which has served to differentiate the two conditions quite definitely. From the clinical standpoint, however, the transition from the rheumatic type into the secondary Streptococcus type cannot be definitely recognized. Various types of Streptococci grown from the blood of patients with rheumatic fever have been studied. The Streptococcus described by Poynton and Payne deserves first mention. This organism has not been described in sufficient detail to permit its recognition as a distinct biological species. Others have described Streptococci associated with rheumatic fever variously as *Streptococcus viridans*, *Streptococcus anhemolyticus*, *Streptococcus non-hemolyticus*, etc.

The serological study of the strains thus isolated has been disappointing in that no dominant immunologic group could be identified. Yet many observations on the production of arthritis and cardiac lesions in animals are on record from the inoculation of these diverse strains of Streptococci.

Notwithstanding the studies heretofore made of Streptococci which have been isolated, no one prior to my discovery and invention has been able to effect a biological grouping of these Streptococci or the infection of experimental animals with the reproduction of the miscroscopic lesion of the myocardium in rheumatic fever.

I have discovered and shall hereinafter describe a Streptococcus which has a specific immunologic identity and capable of a biological grouping; which was isolated from the blood of a patient suffering from rheumatic fever; which also has been isolated and cultured in a large number of instances from material obtained from the throats of patients having rheumatic fever; which is capable of producing characteristic arthritic and cardiac pathology in rabbits, including Aschoff-like nodules; and with which a specific therapeutic serum may be and has been prepared which is effective in terminating the toxic and other clinical manifestations in the patients suffering from rheumatic fever.

I have named the bacterium discovered by me and having the characteristics indicated "*Streptococcus cardioarthritidis*."

The objects of my invention may be stated to be the discovery of the bacterium *Streptococcus cardioarthritidis* specific for rheumatic fever, and the employment thereof in the preparation of antigens, filtrates, toxins, vaccines and an antiserum for use in the treatment and prevention of rheumatic fever.

The bacterium was isolated from a patient suffering from rheumatic fever in which the joint involvements began several days subsequent to an onset of tonsillitis. The culture was made in infusion broth (pH 7.6) and showed growth turbidity on the ninth day of incubation. In subculture upon the surface of horse blood agar, small gray colonies producing absolutely no change upon the blood of the medium were revealed. Smears of the subcultures on blood agar showed a Gram positive coccus in short chain formations.

The strain which was isolated in the first instance was injected into rabbits and was found to produce in them conditions simulating rheumatic fever in human beings.

Following repeated injections of *Streptococcus cardioarthritidis* a very potent antiserum was obtained from rabbits. This serum was employed for treating a patient suffering from rheumatic fever with chorea. There was a termination of the clinical symptoms of chorea and arthritis by crisis. In consequence of this very favorable result it was determined to enlarge upon the production of antiserum by using horses.

It may be noted that a portion of the serum obtained from rabbits as heretofore set forth was used for the specific immunologic identification of the strains of *Streptococcus cardioarthritidis* obtained from subsequent patients.

*Streptococcus cardioarthritidis* is a spherical Gram positive coccus which in fluid media yields diffuse growth and shows short chain formations. It is readily stained by the ordinary anilin dyes. It is non-motile, aerobic and facultative anaerobic. Neither flagellæ, spores nor capsules have been observed. It is of rather constant, uniform size, varying from 0.7 to 1.2 microns in diameter. The optimum temperature for growth is 37° C., but growth at lower temperatures occurs. The organism is insoluble in bile. Heated to 60° C. it is killed in from five to ten minutes. Growth fails to occur on any but the richer media. On coagulated serum, very small moist, smooth, flattened, white colonies appear. There is no digestion of the serum medium. In plain infusion broth, pH 7.6, a diffuse turbidity with slight sedimentation develops in twenty-four hours. Upon longer periods of incubation, slight clumping occurs with sedimentation and a tendency toward clearing of the supernatant fluid. The different strains differ only slightly in the tendency to clumping upon growth in broth, some requiring longer periods of incubation than others. However, all show diffuse growth after eighteen to twenty-four hours. In plain infusion broth the twenty-four hour growth corresponds to from one-fourth (¼) to one-third (⅓) of a billion of *Streptococcus cardioarthritidis* per cc. of broth. The addition of glucose to the broth in amounts varying from 0.1 per cent upward very greatly enhances the growth. Growth of from one to three billions of *Streptococcus cardioarthritidis* per cc. may be obtained in this manner in twenty-four hour cultures. The growth remains diffuse in twenty-four hour cultures in glucose broth, but after several days' incubation it tends to clump and settle out. The media containing glucose is acidified without gas formation.

In Dunham's peptone, plain extract broth (pH 6.6), and plain extract agar (pH 6.6) growth fails. On the veal-broth-brain agar (pH 7.6) good growth is obtained. The colonies appear smooth, round, dome shaped and transparent. The bases are round and the edges of the colonies regularly outlined.

In carbohydrate media, glucose, sucrose, inulin, raffinose and salicin have been fermented with acid formation but with no formation of gas. Mannitol has not been fermented in any instance. Lactose may or may not be fermented.

The appearance on blood agar is most characteristic. Growth has been studied on plain infusion agar, enriched with 5 per cent by volume of defibrinated horse blood. In preparing blood agar, the blood is evenly distributed and the media poured in thin layers (two to three millimeters deep) in Petri dishes. Upon such media after twenty-four hours, and indeed after longer periods, no change in the hemoglobin is effected. There is neither the slightest hemolytic action nor any tendency to the formation of methemoglobin. Green or dirty brown discoloration about the colonies is entirely absent. The colonies on blood agar by transmitted light appear a characteristic opaque red-brown color. This opacity of the colony on blood agar is characteristic and serves to differentiate it easily from colonies of *Micrococcus catarrhalis*, *Bacillus influenzæ* and *Staphylococcus*. By reflected light the colonies are a gray white. They have regularly outlined, round bases and vary in size from a pin point to about one millimeter in diameter. Upon touching them with an inoculating wire, they are of a soft, pasty consistency. They do not shove along the surface of the agar nor are they lifted off in their entirety.

Having thus described my invention, what

I claim and desire to secure by Letters Patent is,—

1. The process which consists in isolating the *Streptococcus cardioarthritidis* and growing the same in suitable media for the purpose of producing antigens.

2. The process which consists in isolating the *Streptococcus cardioarthritidis* and growing the same in suitable media for the purpose of producing toxins.

3. The process which consists in isolating the *Streptococcus cardioarthritidis* and growing the same in suitable media for the purpose of producing vaccines.

4. The process which consists in isolating the *Streptococcus cardioarthritidis* and growing the same in suitable media for the purpose of producing antigens, filtrates, toxins and vaccines for injecting animals for the antiserum specific for rheumatic fever.

5. As a new product, the antigen of the *Streptococcus cardioarthritidis*.

6. As a new product, toxins of the *Streptococcus cardioarthritidis*.

7. As a new product, vaccines of the *Streptococcus cardioarthritidis*.

8. As a new product, a *Streptococcus cardioarthritidis* antiserum specific for rheumatic fever, its complications and sequela.

In testimony that I claim the foregoing as my invention I have hereunto signed my name this 11th day of January, A. D. 1927.

JAMES CRAIG SMALL.